(No Model.)
W. LEWIS.
DRAFT EQUALIZER.
No. 276,611. Patented May 1, 1883.
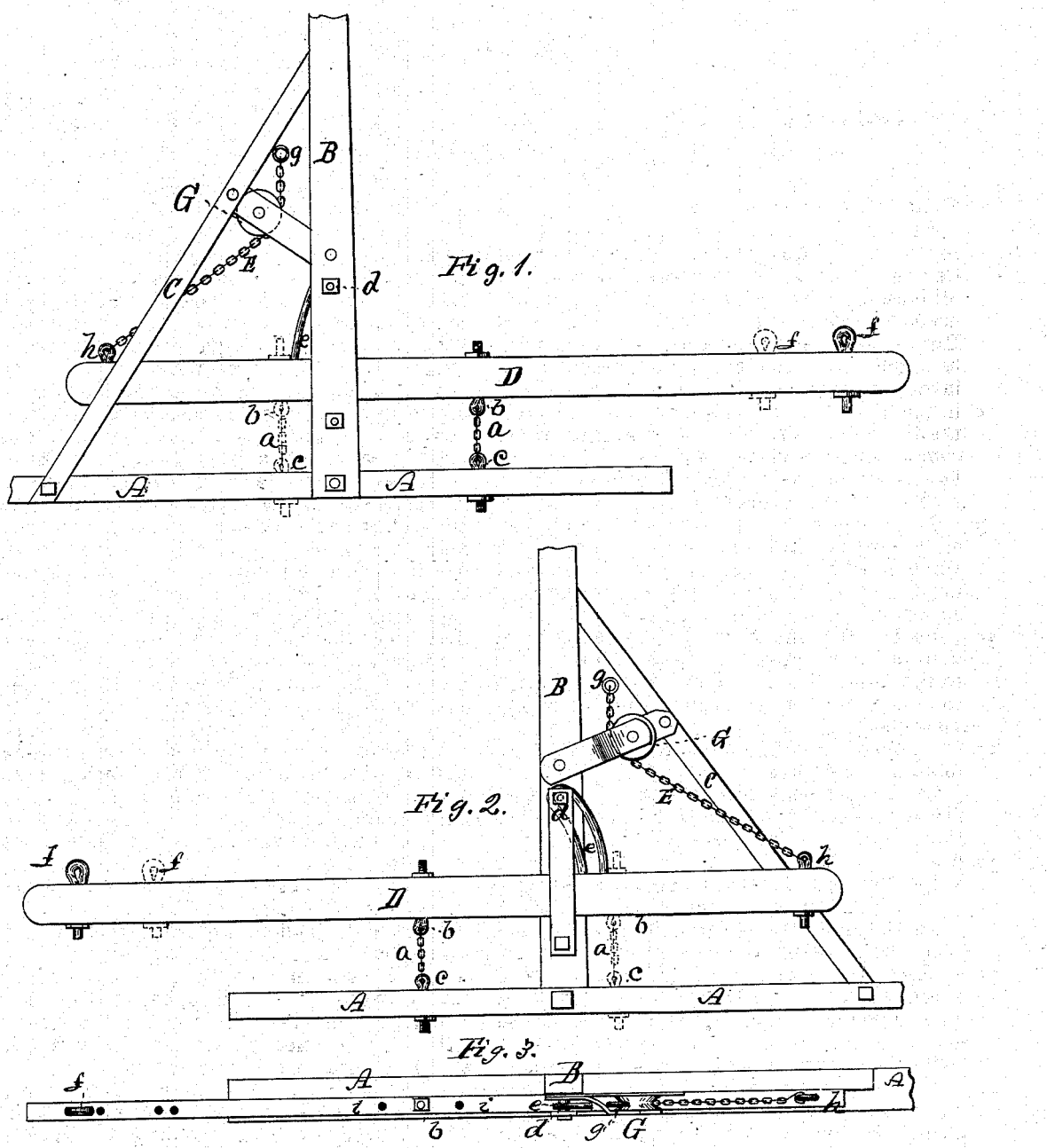
WITNESSES
W. A. Jones.
A. J. Brown.
INVENTOR
William Lewis,
By J. B. Sawyer

UNITED STATES PATENT OFFICE.

WILLIAM LEWIS, OF SAUK CENTRE, MINNESOTA.

DRAFT-EQUALIZER.

SPECIFICATION forming part of Letters Patent No. 276,611, dated May 1, 1883.

Application filed November 22, 1882. (No model.)

*To all whom it may concern:*

Be it known that I, WILLIAM LEWIS, a citizen of the United States, residing at Sauk Centre, in the county of Stearns and State of Minnesota, have invented certain new and useful Improvements in Draft-Equalizers for Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The purpose of my invention is to produce an improved draft-equalizer for harvesters which shall compensate for and obviate side draft, and which may be adapted to teams of either four horses or three horses.

In the drawings, Figure 1 represents a top view of my improved draft-equalizer applied to the frame of a harvester; Fig. 2, a view of the under side of the same; Fig. 3, a front view thereof.

Like letters designate corresponding parts in all of the figures.

Let A represent the part of a harvester-frame to which the equalizer is attached, B the tongue of the harvester, and C the tongue-brace.

I make use of an equalizing or evener bar, D, to which the teams are attached, and by the arrangement of which and its adjuncts I effect the purposes of my invention. For proper dimensions, the bar may be made of wood seven feet long, four inches wide at the near end, three and a half inches wide at the off end, and two inches thick. It is connected with the harvester-frame by a short chain or link, $a$, and two eyebolts, $b\ c$, passing respectively through the evener-bar and the frame-piece, both held by nuts, so that the chain or link can be readily detached from either. The evener-bar also has a slot-guide, $e$, playing over a guide-pin, $d$, under the harvester-tongue to keep the evener-bar from side sway in its action. For double teams of four horses the connecting-chain is attached to the center of the evener-bar, as shown by full lines in Fig. 1, and the off-team is hitched to it at the eyebolt $f$ by an ordinary whiffletree and clevis. The near team, one horse walking at one side and the other horse walking at the other side of the tongue B, is hitched to the ring $g$ of a chain, E, which is attached at the other end to the near end $h$ of the evener-bar, and extends thence inward toward the tongue, passing around a stationary sheave, G, mounted, as shown, under the tongue and brace near the tongue. The direction in which this draft-chain pulls on the harvester when drawn by the team counteracts the side draft of the harvester and compensates therefor; and this has the same action whether four horses or three horses are hitched to the harvester, the arrangement for three horses being thus: The connecting-chain $a$ is moved from its position above set forth to a position near the tongue, as shown by dotted lines in Fig. 1, and secured to both the frame and the evener-bar there, the bar not being shifted in position. The eyebolt $f$, for hitching the off-team, of one horse, is shifted inward a little to the position shown by dotted lines in Fig. 1, so as to have double the leverage of the two near horses, which draw just the same as for four-horse teams. In order to favor light or weak teams pulling against stronger teams, the connecting-chain $a$ may be shifted to one side or the other of the proportional position by passing through side holes at different distances therefrom, as shown at $i\ i$, Fig. 3.

What I claim as new, and desire to secure by Letters Patent, is—

1. In combination with a harvester, the evener-bar D and connecting chain or link $a$, the said chain or link being adapted to be shifted to different positions, both on the evener-bar and on the harvester frame, whereby either equal or unequal teams may be employed at will, substantially as herein specified.

2. The combination of the harvester-frame, the evener-bar D, having a shifting connection with the said frame, the tongue B, sheave G, carried by the tongue, and the chain E, all substantially as and for the purpose herein specified.

In testimony whereof I affix my signature in presence of two witnesses.

WILLIAM LEWIS.

Witnesses:
C. M. SPRAGUE,
R. C. AMBLER.